(12) United States Patent
Bozkurt et al.

(10) Patent No.: US 8,061,397 B2
(45) Date of Patent: Nov. 22, 2011

(54) CENTRAL TIGHTENING SYSTEM FOR ANTI-SKID DEVICES AND AN ANTI-SKID DEVICE HAVING THE SAME

(76) Inventors: Emrah Bozkurt, Instabul (TR); Ender Bozkurt, Instanbul (TR)

(*) Notice: Subject to any disclaimer, the term of this patent is extended or adjusted under 35 U.S.C. 154(b) by 175 days.

(21) Appl. No.: 12/159,934

(22) PCT Filed: Dec. 29, 2006

(86) PCT No.: PCT/EP2006/070277
§ 371 (c)(1),
(2), (4) Date: Sep. 25, 2008

(87) PCT Pub. No.: WO2007/077204
PCT Pub. Date: Jul. 12, 2007

(65) Prior Publication Data
US 2009/0151834 A1 Jun. 18, 2009

(30) Foreign Application Priority Data
Jan. 3, 2006 (EP) .................... 06100045

(51) Int. Cl.
*B60C 27/10* (2006.01)

(52) U.S. Cl. ....... 152/218; 152/221; 24/71 TT; 24/577.1
(58) Field of Classification Search ............... 152/217, 152/218, 219, 221, 222; 24/68 SK, 70 SK, 24/71 SK, 68 TT, 70 TT, 71 TT, 577.1, 69 ST, 24/70 ST, 71 T, 71 ST, 798
See application file for complete search history.

(56) References Cited

U.S. PATENT DOCUMENTS

| | | | | |
|---|---|---|---|---|
| 982,630 A * | 1/1911 | Paul | ............................. | 152/179 |
| 1,768,370 A * | 6/1930 | Pearson et al. | ................ | 152/222 |
| 2,066,368 A * | 1/1937 | Snyder | ...................... | 152/225 R |
| 2,174,345 A * | 9/1939 | Worthing | .................. | 152/213 R |
| 2,267,242 A * | 12/1941 | Lutey | ............................. | 152/221 |
| 2,270,692 A * | 1/1942 | Stanton | ........................ | 152/222 |
| 2,433,605 A * | 12/1947 | Faulds | .................... | 301/37.101 |
| 2,470,607 A * | 5/1949 | Dritz | ............................. | 152/221 |
| 2,685,903 A * | 8/1954 | Lutey | ............................. | 152/222 |
| 2,687,160 A * | 8/1954 | Norton | ........................ | 152/222 |
| 2,746,508 A * | 5/1956 | Doughty | ...................... | 152/218 |
| 3,091,274 A * | 5/1963 | Winkelspecht | ............... | 152/218 |
| 4,528,700 A * | 7/1985 | Johnston | .......................... | 2/338 |
| 4,670,946 A * | 6/1987 | Olivieri | ....................... | 24/71 SK |
| 4,843,688 A * | 7/1989 | Ikeda | ............................. | 24/170 |
| 4,918,790 A * | 4/1990 | Cirket et al. | ................. | 24/71 R |

(Continued)

FOREIGN PATENT DOCUMENTS

DE 32 27 872 A1 1/1984
(Continued)

*Primary Examiner* — Russell Stormer
(74) *Attorney, Agent, or Firm* — Arent Fox, LLP

(57) ABSTRACT

A tightening system of straps for use in anti-skid and traction enhancement devices is disclosed. The tightening system comprises a central node which is located on the principle axis of the axle of a wheel and which has a plurality of extensions adapted to fasten a plurality of radially extending straps around its periphery. A plurality of radially extending flexible straps, which are attached to a surface contact member at their first 10 ends and to the central node at their second ends, are used to tighten the anti skid device. The flexible straps are passed through a buckle for tightening the surface contact members in the radial direction in order to eliminate outward bulging on the surface contact members as well as to avoid eccentricity in the strap system.

7 Claims, 10 Drawing Sheets

U.S. PATENT DOCUMENTS

| | | | | |
|---|---|---|---|---|
| 5,284,196 A | * | 2/1994 | Nielsen | 152/216 |
| 6,163,941 A | * | 12/2000 | Lai | 24/593.11 |
| 6,619,353 B1 | | 9/2003 | Kim | |
| 2006/0225254 A1 | * | 10/2006 | Fu | 24/68 TT |

FOREIGN PATENT DOCUMENTS

| | | |
|---|---|---|
| DE | 203 15 855 U1 | 2/2005 |
| FR | 2 626 532 A1 | 8/1989 |
| JP | 04 027608 A | 1/1992 |

* cited by examiner

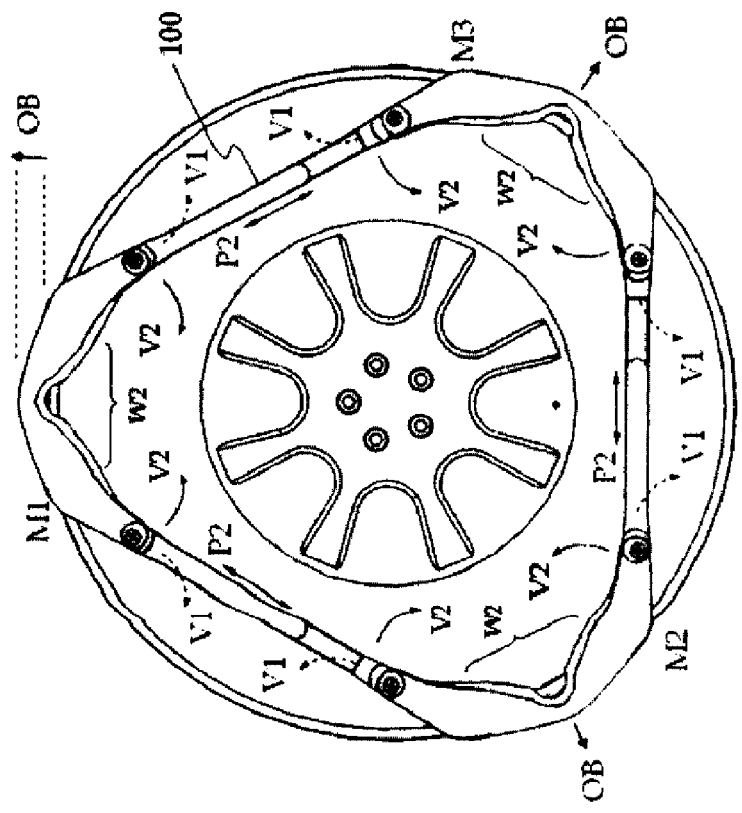
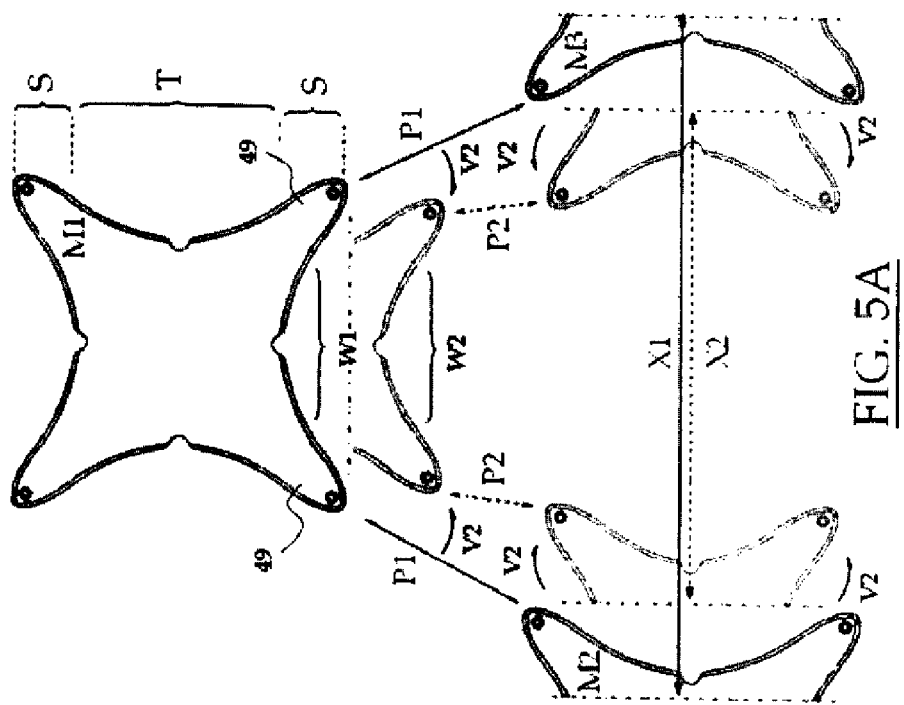
FIG. 5A
FIG. 5B
PRIOR ART

CENTRAL TIGHTENING SYSTEM FOR ANTI-SKID DEVICES AND AN ANTI-SKID DEVICE HAVING THE SAME

CROSS-REFERENCE TO RELATED APPLICATION

This is a National Stage entry of International Application No. PCT/EP2006/070277, filed Dec. 29, 2006. The disclosure of the prior application is hereby incorporated herein in its entirety by reference.

TECHNICAL FIELD OF THE INVENTION

The present invention relates to a central tightening system of straps for use in anti-skid and traction enhancement devices. The central tightening system proposed by the present invention provides a light weight, flexible, easily and quickly installable tire anti-skid device. The central tightening system can be adapted for use with many conventional anti skid devices, e.g. snow chains presently existing in prior art applications.

DESCRIPTION OF THE PRIOR ART

As well known by those skilled in the art, snow chains are not of the type "one-size fits all" and an individual snow chain can be applied to a very limited number of tire sizes. Also, installation of many snow chains is complicated, risky, messy and physically difficult for many of the users, especially for physically weak users. Generally, the installation of a snow chain results an unbalanced wheel as the user has to secure the system tight at an arbitrary location around the periphery of the wheel which causes slack occurrence in the end of the installation. Once the snow chain is tightened, chain parts generally heap or pile at one part of the wheel more than other parts, resulting in an unbalanced ride due to unbalanced and decentralized tightening. It is also generally true that the users have to drive the vehicle for a few hundred meters and stop to take up the final slack of the snow chain.

No need to mention, these devices are generally made of steel, which makes the snow chain heavy and difficult to install or handle. In order to overcome the latter problem, anti skid devices made of polymer materials have recently been proposed. These comprise flexible surface contact members which are fastened to each other around the periphery of the tire. However, it is again not possible to suggest that these are of the type "one-size-fits-all" and various sizes shall be manufactured and put to market in order to meet the demand. Apparently, this increases the costs associated with manufacturing, labor, storing, marketing etc. Also, if the flexible surface contact members do not perfectly fit the tire, slacks always remain in the system since said surface contact members outwardly bulge along the tire periphery due to dimensional incompatibility.

JP4325301 discloses one such anti skid device which has radially arranged arms for mounting a snow chain on a wheel. A major drawback of proposed anti skid device is that the system is not adapted for tightening although the arms are extending radially from a center. Apparently, the system is not of the type "one size fits all" and various sizes shall be manufactured to meet the market demand.

JP4027608 discloses an antiskid device consisting of radial members fixed at the circumferential end part of a circular frame at equal intervals, connecting members which connect the adjacent, radial members and spike pins planted at positions such as the intersection of the radial member and connecting member. The free edges of respective radial members are provided with holes, through which clamping wires are made to pass for support. A major drawback of the system is that the tension cannot be distributed homogenously around the periphery of the wheel. Another drawback results from the fact that the vehicle has to be moved-on top of a previously laid anti skid device-after the first step of the installation is completed.

SUMMARY OF THE INVENTION

The central tightening system proposed by the present invention has a plurality of radially extending straps which connect to a surface contact member at their outer end and which connect to a central node at their inner end. These straps comprise a ratcheted section and a buckle to secure the ratcheted section of the straps. As the straps are radially extending and tightened in the radial direction of the tire, eccentricity is avoided in the final installation of the anti skid device. Moreover, the use of ratchet mechanism provides and ensures accurate and precise tensioning of the system. Furthermore, complicated installation is prevented while the weight of the anti skid device is reduced considerably compared to conventional anti skid devices. The latter is accomplished by use of highly durable and sufficiently flexible polymer materials in the production of surface contact members and/or fastening or tightening elements.

OBJECTS OF THE PRESENT INVENTION

An object of the present invention is to provide a central tightening system which has a plurality of radially extending straps connecting a surface contact member to a node found on the center of the wheel and which is tightened in the radial direction, in order to avoid eccentricity, by means of a securing means found on the central node or on the radial straps.

A further object of the present invention is to provide a central tightening system for anti skid devices, where tightening of the surface contact members is realized towards a central node in the radial direction in order to eliminate outward bulging on surface contact members, and therefore slack occurrence.

Still a further object of the present invention is to provide a central tightening system for anti skid devices, which makes an anti-skid or a traction enhancement device substantially non-rigid and allows easy installation or uninstallation.

Still a further object of the present invention is to provide a central tightening system for anti skid devices which helps to maintain a light weight anti-skid or traction enhancement device.

Still a further object of the present invention is to provide a central tightening system for anti skid devices which is not fixed on the hub by any means, and therefore does not require hub cap or wheel cover removal.

Still a further object of the present invention is to provide a central tightening system for anti skid devices where fastening and tightening of the system is realized by special securing means which provide incremental, accurate and precise tightening as well as mechanical advantage during tightening.

Still another object of the present invention is to provide an anti skid device which is one-size-fits-all, and which is constructionally flexible and adaptive so as to accommodate any irregularities that may exist during mounting.

Yet another object of the present invention is to provide a tightening mechanism which is universally applicable to a wide variety of wheel configurations, tire dimensions, wheel covers and hub caps.

Other further objects of the present invention will become apparent from accompanied drawings, brief descriptions of which follow in the next section as well as appended claims.

BRIEF DESCRIPTIONS OF THE DRAWINGS

FIG. 5A shows the front view of unfolded positions of X-shaped surface contact members for two different tire diameters illustrates how their shapes and alignments change for different tire dimensions.

FIG. 5B shows the front view of a system found in prior art in its tightened position upon obliquely pulling X-shaped surface contact members to each other from their proximal ends, which in the end causes serious outward bulging on the surface contact members when mounted on a tire having a diameter and/or a tread portion width smaller than desired.

DETAILED DESCRIPTION OF THE INVENTION

Hereinafter, preferred embodiments of the present invention will be described in detail with reference to the accompanying drawings which are given solely for the purpose of exemplifying a number of embodiments according to the present invention.

The tightening system of the present invention comprises one or more connecting members for attachment to the surface contact members. These connecting members connect surface contact members to a central node found right on top of the hub from their proximal ends and tighten the anti skid device in the radial direction on the wheel.

Figure 1A:
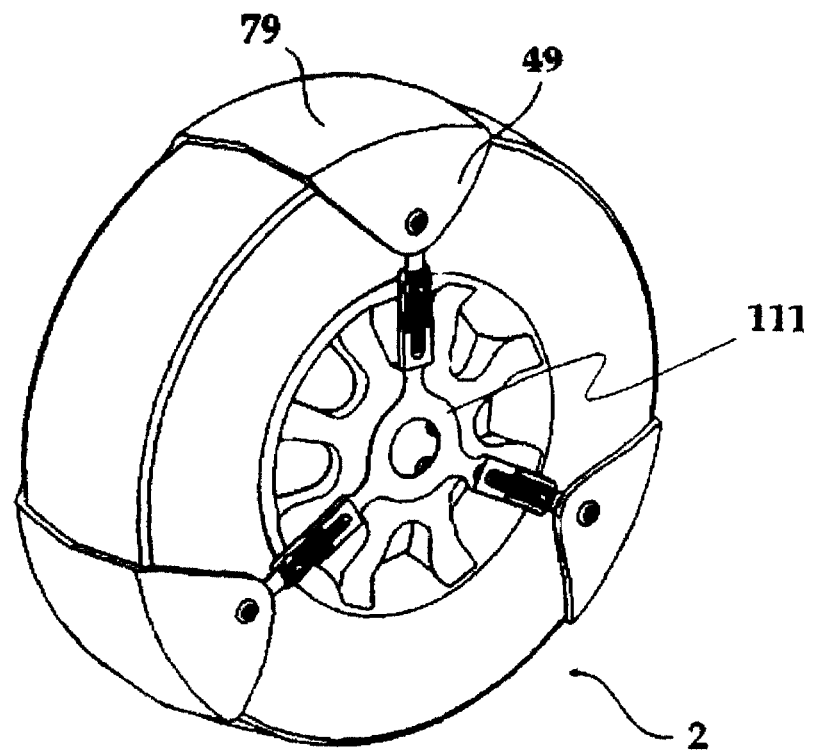
FIG. 1A shows a tightening system having a terminal node and substantially U-shaped surface contact members mounted on a tire from the outside of the tire in its fastened position.

FIG. 1A shows the first preferred embodiment of an anti skid device installed on a wheel from its outer side (2). The central tightening system of the anti skid device comprises a central node (111) around which a plurality of tightening straps are attached, preferably in equal distances. The U-shaped surface contact members of this embodiment are illustrated with their gripping surfaces (79) and a shoulder portion (49) at the tip of which attachment means are used for securing tightening straps.

Figure 1B:
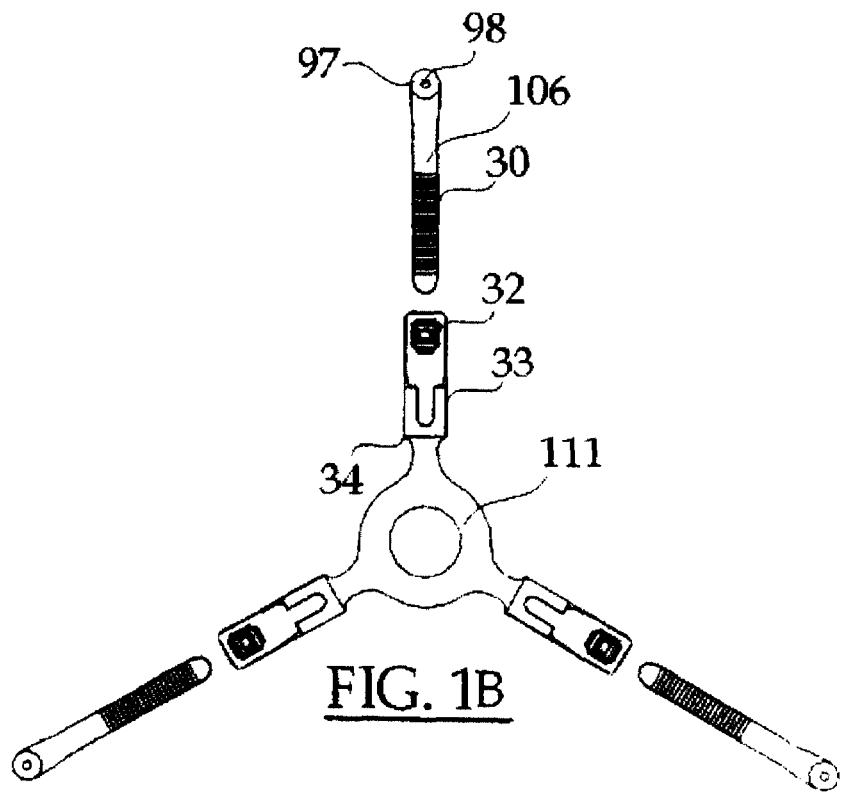
FIG. 1B shows the tightening system of FIG. 1A in its unfastened position, and the ratcheted straps completely detached from the surface contact members prior to assembling the device for sales.

The first embodiment proposes use of ratcheted straps (106) extending radially from the tip of a surface contact member towards the center of the wheel. These straps are generally attached to the tips of surface contact members by means of joints (97, 98), or they are extensions or integral parts of surface contact members. The central node (111) in this case has a plurality of securing means e.g. buckles (32) which will receive the ratcheted straps (106) coming from the surface contact members as shown in FIG. 1B.

Figure 1C:
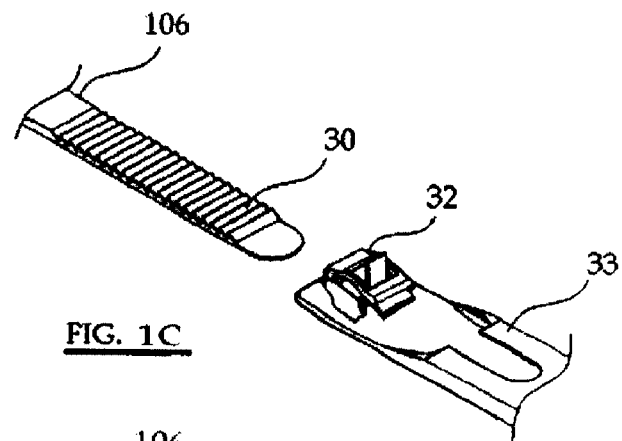
FIG. 1C shows how the ratcheted straps extending from the proximal ends of U-shaped surface contact members meet with the buckles located on the terminal node.
Figure 1D:
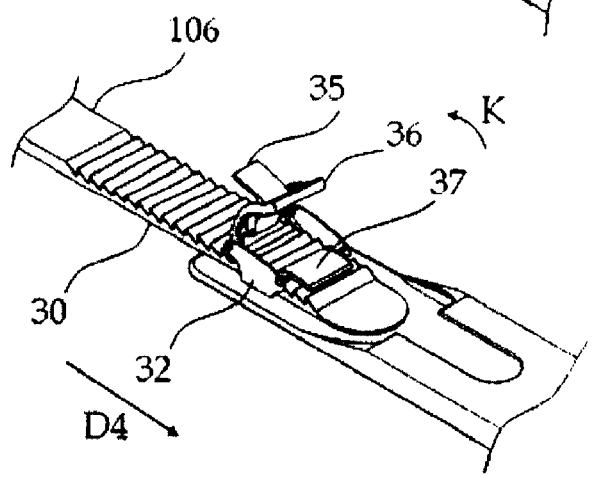
FIG. 1D shows how the ratcheted straps are driven inside the buckles in a way to releasably fasten and tighten the system on the tire.
Figure 1E:
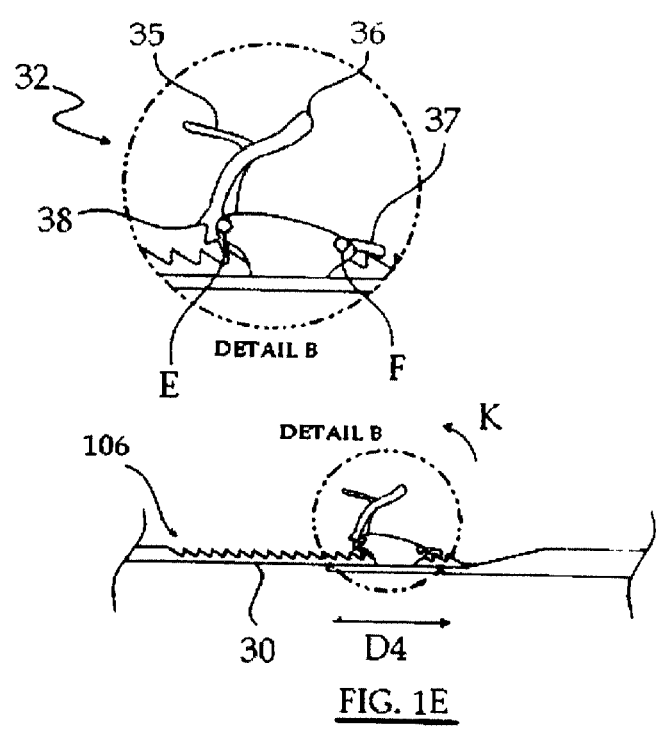
FIG. 1E shows, in detail, how the ratcheted straps are driven inside the buckles in a way to releasably fasten and tighten the system on the tire, by the mechanisms inside the buckles.

FIG. 1C shows a ratcheted strap (106) extending from the surface contact member which comprises a plurality of ratchets (30) on its one face, and another strap extending from the central node (111) comprising a securing means in the form of a buckle (32), and an optional sleeve (33) with an open or closed end. As shown in FIGS. 1D and 1E, the buckle (32) draws the ratcheted strap (106) in direction D4 (FIG. 1D) when the user pulls the driving thumb (36) in direction K as many times as needed to adjust the tightness of the surface contact members. The ratcheted strap (106) is drawn as the teeth (38) of the buckle (32) drives ratchet teeth (30) of the strap (106) in direction D4 by pushing a pawl (37) up around joint F. The driving thumb (36) and the release thumb (35) are pivoted around joint E and move together as the user pulls the driving thumb (36) in direction K of FIG. 1E. Joint E and F have springs (not shown) to call back thumbs (35, 36) and the pawl (37). FIG. 1G shows how the ratchet teeth (30) of the strap (106) are released from the teeth (38) and pawl (37) of buckle (32) and how the system is then unfastened by pulling the strap (106) out of said buckle (32) in direction L. In the locked state, the ratchet teeth (30) of strap (106) are fixed by means of pawl (37) and teeth (38) of buckle (32), and said strap (106) is prevented to move back in direction L. Detail C, however, shows that, in order to release the system, the user shall pull the release thumb (35) in direction R so that it touches the pawl (37) and lifts it up like a seesaw in direction G, disengaging the pawl (37) from the ratchet teeth (30). At the same time, the teeth (38) of buckle (32) also disengage from the ratchet teeth (30). Then, the user unfastens the system by pulling the strap (106) in direction L. Detail C shows, in phantom lines, the positions of pawl (37) and release thumb (35) in the locked state.

Figure 1F:
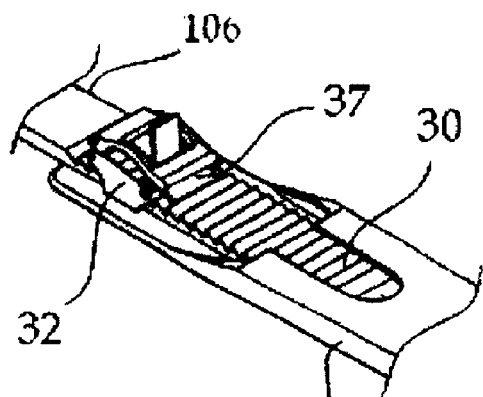
FIG. 1F shows how the ratcheted straps and buckles are coupled in the fastened position.
Figure 1G:
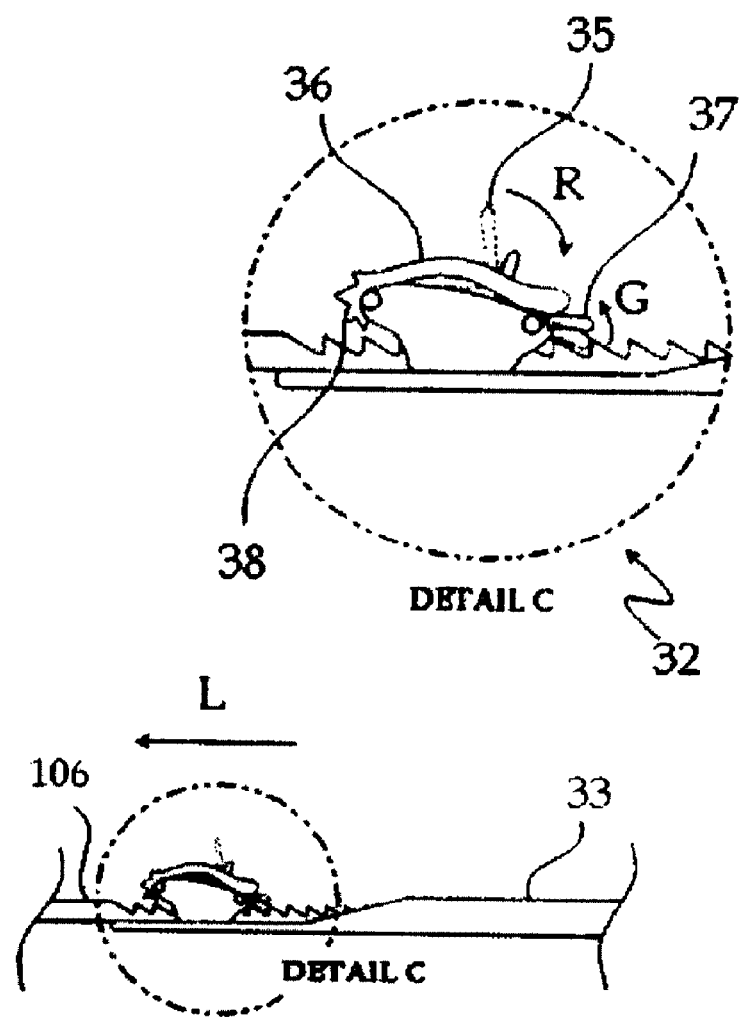
FIG. 1G shows how to unfasten the system and to release the ratcheted straps from the buckles by disengaging the pawls and teeth of buckles from the ratchet teeth of straps.

While FIG. 1E shows how the ratcheted straps (106) are driven inside the buckles (32) in a way to fasten and tighten the system, FIG. 1F shows how the ratcheted straps (106) and buckles (32) are coupled in the fastened position. FIG. 1G illustrates how the system can be unfastened in detail for releasing the ratcheted straps (106) from the buckles (32).

Figure 2A:
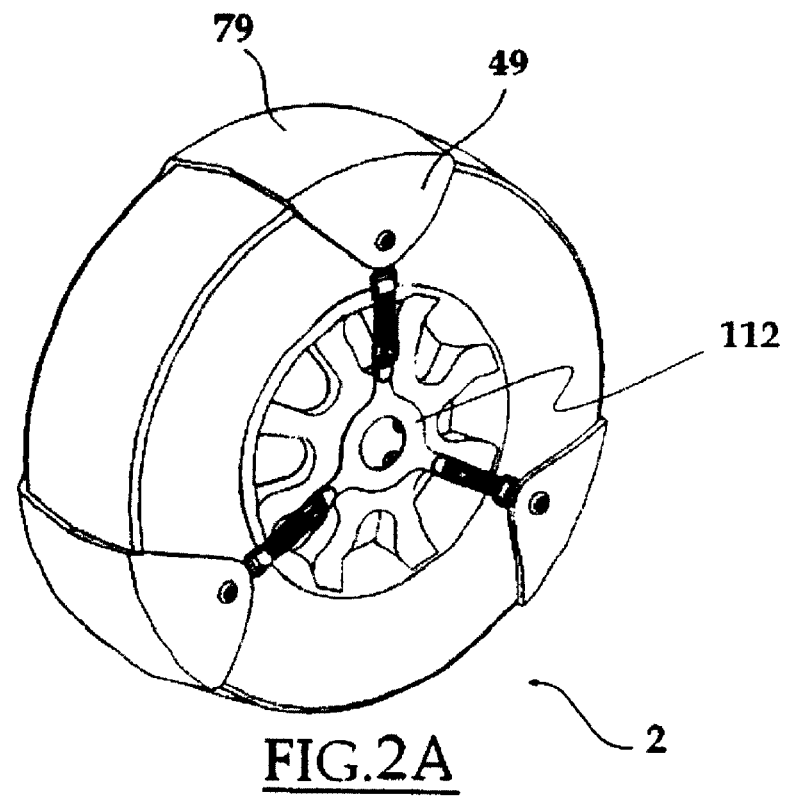
FIG. 2A shows an alternative tightening system having a terminal node and U-shaped surface contact members mounted on a tire from the outside of the tire, and fastened.
Figure 2B:
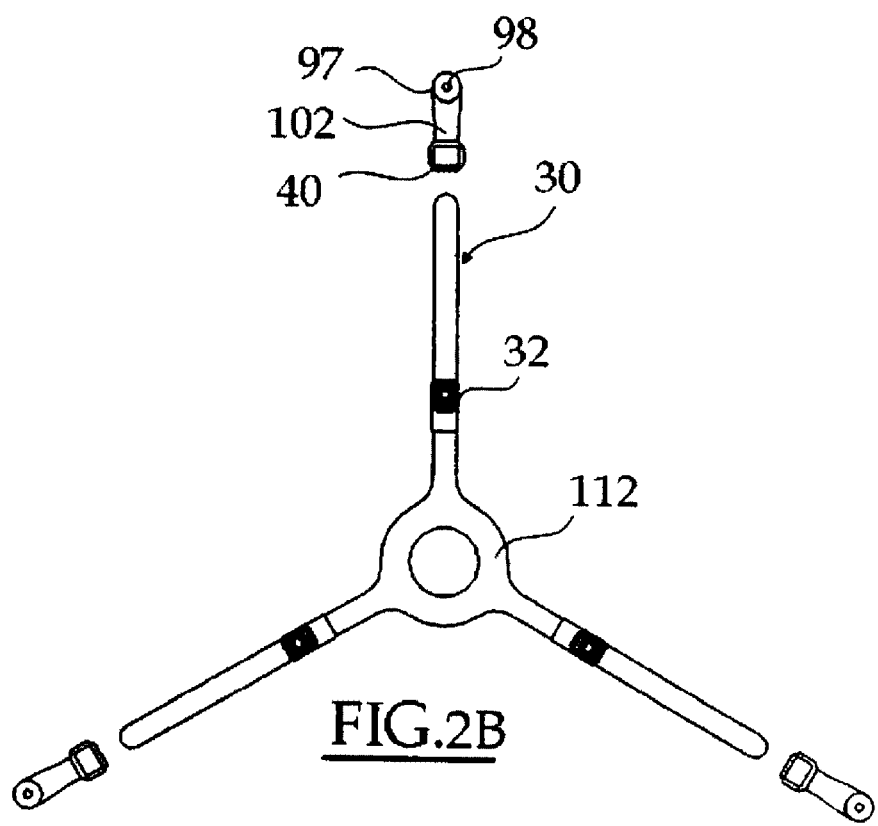
FIG. 2B illustrates the tightening system of FIG. 2A in its unfastened position, and the straps with slots completely detached from the surface contact members prior to assembling the device for sales.

FIG. 2A shows the second embodiment of the anti skid device according to the present invention. In this embodiment, the central node (112) has a plurality of straps extending radially towards the surface contact members. Obviously, means for securing these straps are maintained on the corresponding straps (102) which are generally attached via a joint (97) to the tip portion of the surface contact members as shown in FIG. 2B, or which are extensions or integral parts of surface contact members. A clip (40) is proposed at the tip of each of the straps (102) of the surface contact members for connecting to the straps with ratchet teeth (30) and buckles (32) extending from the central node (112).

Figure 2C:
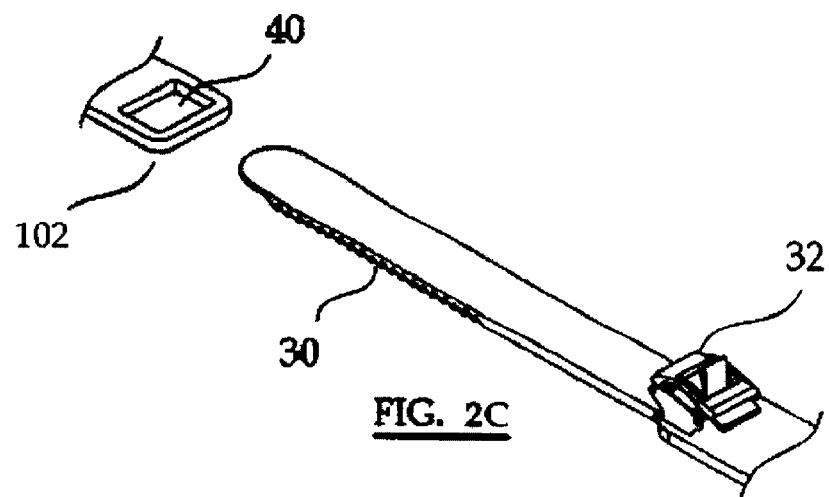
FIG. 2C shows how the straps with slots that extend from the proximal ends of U-shaped surface contact members meet with the straps, having a buckle on one face and ratchet teeth on the opposite face, extending from the terminal node.
Figure 2D:
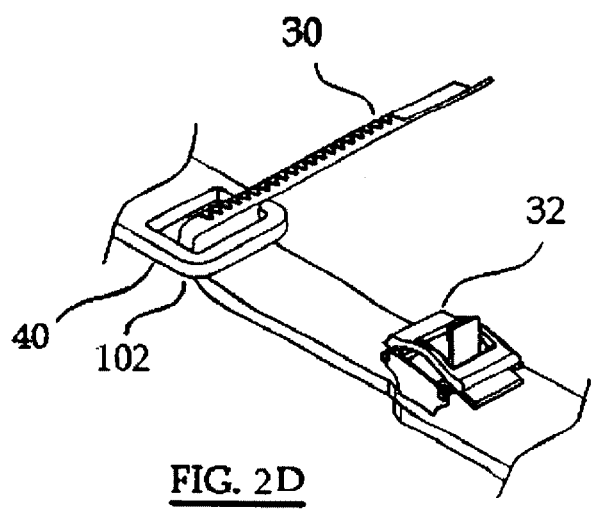
FIG. 2D shows how the strap extensions of terminal node are passed inside the slots and folded back onto themselves making the section with ratchet teeth visible and ready to be driven inside the buckle on the top.
Figure 2E:
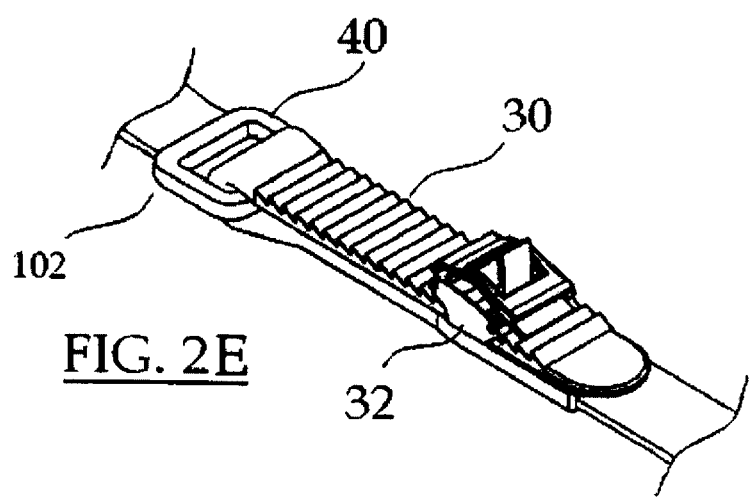
FIG. 2E shows the straps and extensions of system of FIG. 2A in the fastened position.

FIG. 2C shows the strap (102) with clips (40), and the other straps that have ratchets (30) on one face and a buckle (32) mounted on the other face. After an extension of the strap is passed through the bore of the clips (40) and folded back onto itself, the ratchet teeth (30) are drawn into the buckle (32) and the system is secured. The securing process is exemplified briefly in FIG. 2C to 2E.

Figure 3A:
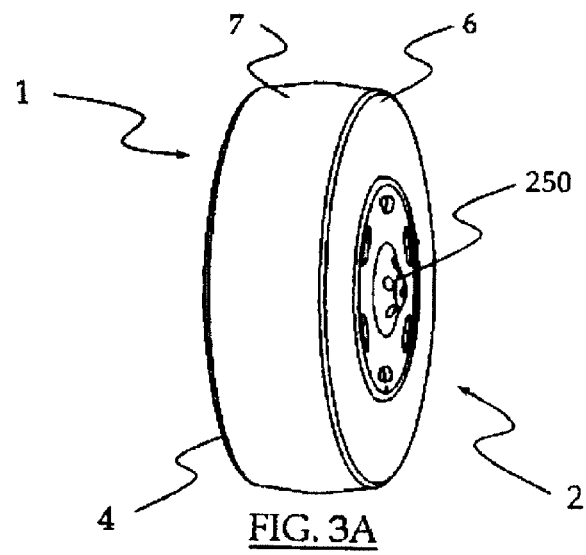
FIG. 3A shows a wheel having an outward protrusion at its central hub.
Figure 3B:
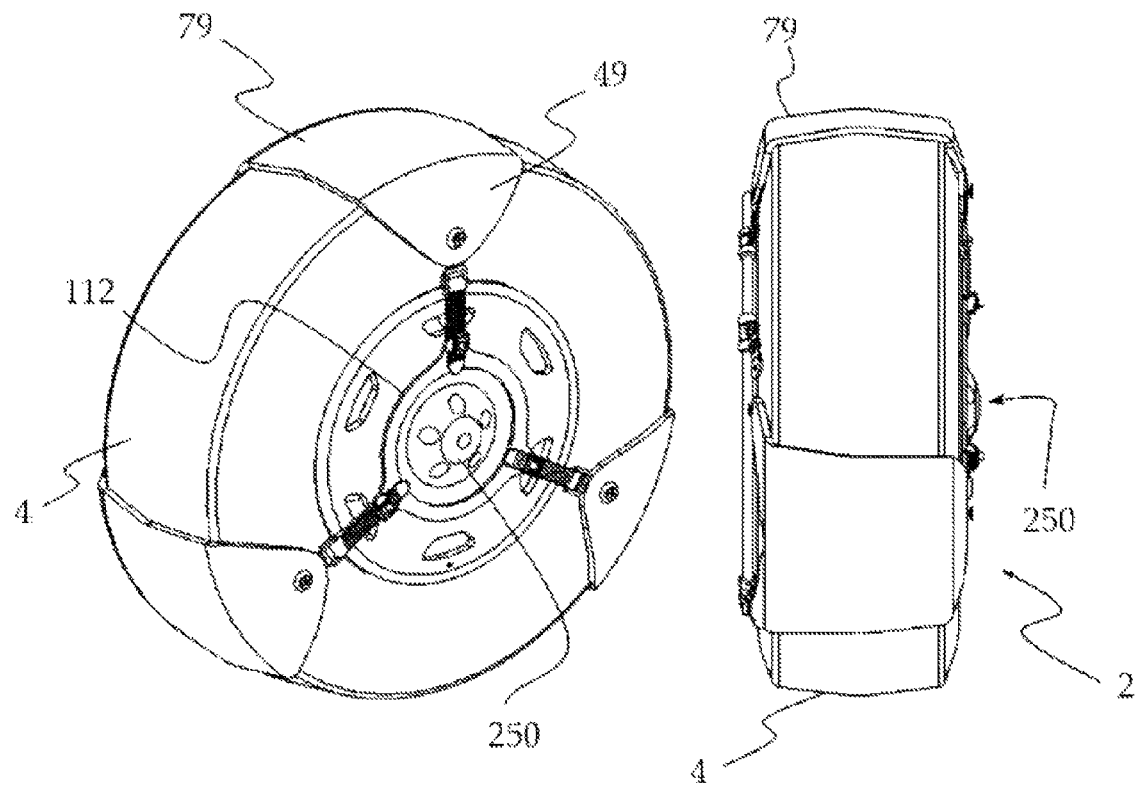
FIG. 3B shows, in the perspective view and in the side view, how the system of the present invention is mounted and fastened onto the wheel of FIG. 3A perfectly, despite the outward protrusion at the central hub.

A wheel having an outward protrusion (250) at its central hub is illustrated in FIG. 3A. A hub cap or the like that protrudes from the center of the wheel can be frequently seen on wheels of buses, trucks and light trucks etc. This outward protrusion (250) poses a major problem for many of the anti skid devices as their presence makes a variety of anti skid devices inapplicable to the wheel. However, since the central portion of the center node (111, 112) according to the present invention is hollow, and since said center node (111, 112) is substantially non-rigid, the tightening system of the present invention is applicable to many existing vehicles. This latter is illustrated in FIG. 3B from a perspective and frontal view of the tire (4).

Figure 4:
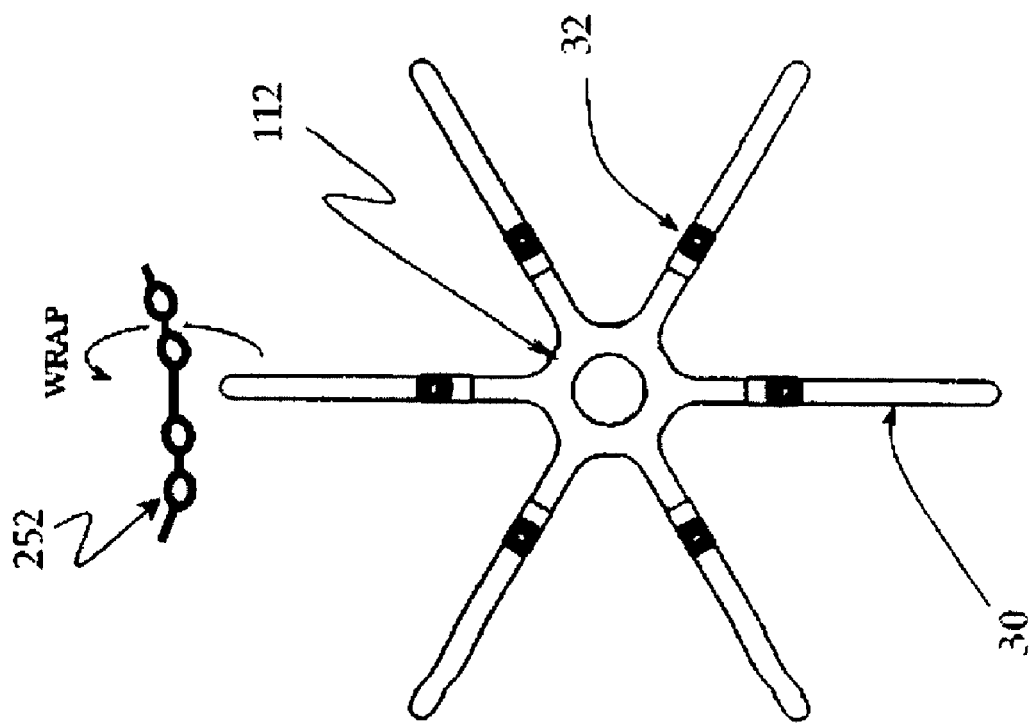
FIG. 4 shows how the system of FIG. 2A applied with its terminal node on an ordinary snow chain. The extensions of the terminal node in this illustration are wrapped under the chain links instead of the slots of straps and folded back onto themselves similar to FIG. 2D.
Figure 4:
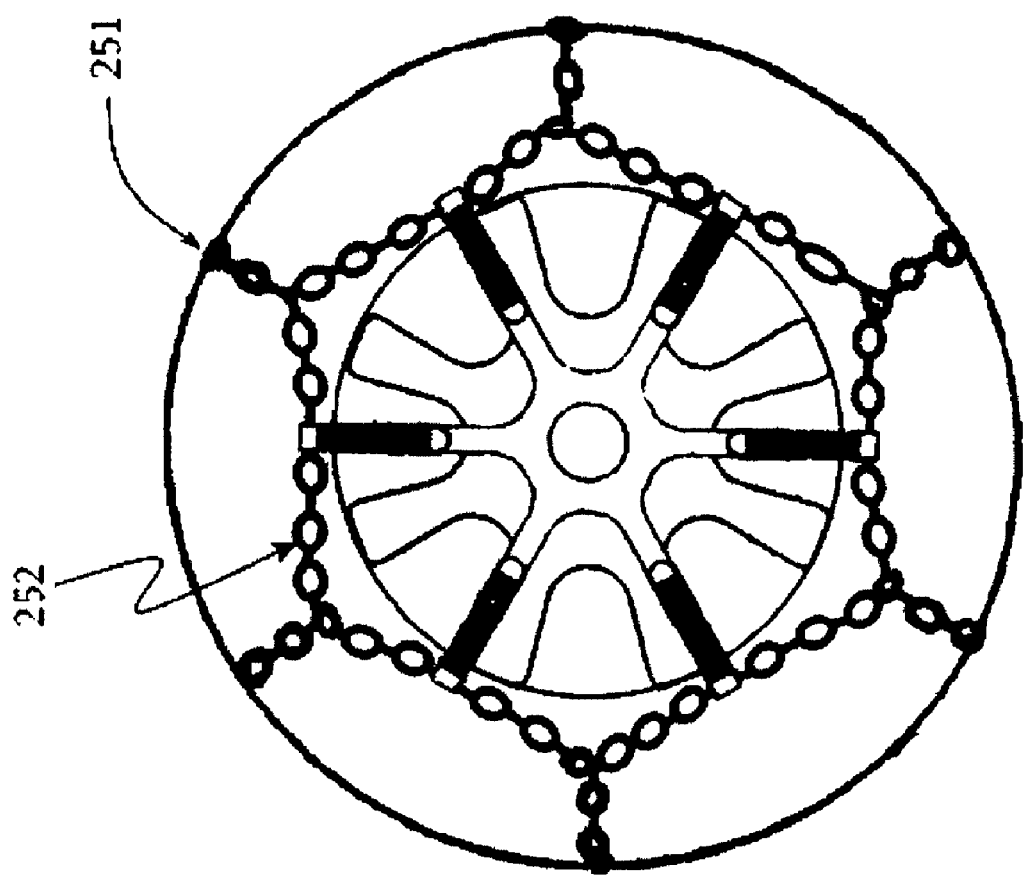

Tightening system proposed by the present invention is also applicable to many existing anti-skid and traction enhancement devices. An embodiment prepared for such a case is illustrated in FIG. 4. The central tightening system of straps is shown in a free form on the right part of the drawing while shown as installed on a conventional snow chain (251) on the left part of the drawing. The conventional snow chain is formed of chain parts on the treaded surface of the tire (4) and connecting chain links (252) on the front and/or the rear face of the wheel (1). The central tightening system has a plurality of outer straps similar to those of FIG. 2B which are wrapped around the chain link (252), folded back onto themselves, tightened and secured by a fastening means, such as a buckle (32).

FIG. 5A shows frontal view of X-shaped surface contact members in unfolded positions for two different tire diameters. Particularly, the figure is intended to illustrate how their shapes and alignments change in case of two different tire dimensions (x1, x2). To better illustrate, FIG. 5B shows the front view of a system in its tightened position. In this figure, X-shaped surface contact members are pulled towards each other obliquely in the peripheral direction (tangential to the tire) from their proximal ends which result in serious outward bulging on the surface contact member when the size of the surface contact member is not suitable to that of the tire (i.e. when the width of treaded portion of tire and/or the tire diameter is smaller than desired).

In FIGS. 5A and 5B, reference numerals M1, M2, M3 denote substantially X-shaped surface contact members used in an exemplary tightening mechanism (100) of the prior art. Shoulder portions (S) of X-shaped surface contact members (M1, M2, M3) correspond to shoulders (6) of the tire (4) (FIG. 6) when the anti skid device is snugly fit on the wheel. Likewise, the treaded portion (T) of X-shaped surface contact members (M1, M2, M3) corresponds to treaded portion (7) of the tire (4) (FIG. 6) in the same case. While X1 is used to denote the suitable diameter of the wheel in the example of FIG. 5A, X2 is used to denote the diameter of a second wheel whose size is not suitable for installation of the same anti skid device of FIG. 5A. It is assumed that X2 is smaller than X1, (X2<X1).

P1 resembles the direction and the distance between the proximal ends of M1 to M2 or M2 to M3 or M1 to M3 under normal conditions i.e. the size of the anti skid device suits that of the wheel or alternatively the length T equals to the width of the treaded portion (7) of the wheel. P2 resembles the direction and the distance between the proximal ends of M1 to M2 or M2 to M3 or M1 to M3 under abnormal conditions i.e. the size of the anti skid device does not suit that of the wheel or alternatively, the length T is larger than the width of the treaded portion (7) of the wheel. Likewise, W1 is the distance between the proximal ends (49) of a single X-shaped surface contact member (M1 or M2 or M3) under normal conditions. Similarly, W2 is the distance between proximal ends (49) of a single X-shaped surface contact member (M1 or M2 or M3) when the device is mounted on a tire which is dimensionally not suitable (i.e. the width of tire tread portion and/or the tire diameter is smaller than desired). In such a case, W2 is smaller than W1 because the X-shaped surface contact member changes shape in order to adapt to the dimensional incompatibility between the device and the tire. The fact that W2 is smaller than W1 results in an outward bulging (OB) of thread portion (T) of X-shaped surface contact members (M1, M2 and M3) when mounted and tightened on the tire (4), which means a continuous slack in the device.

Under normal conditions, proximal ends (49) of X-shaped surface contact members (M1, M2, M3) shall be outwardly stretched in direction (V1) in a way to be stretched and snugly fit on and around the periphery of the tire (1). In FIG. 5A, V2 is the rotational direction that indicates the inward bulging of proximal ends (49) of a single X-shaped surface contact member (M1 or M2 or M3) within itself due to shortening of P1 to P2. "OB" is used to denote the outward bulging of X-shaped surface contact members (M1, M2 or M3) from their tread portions (T) when they are mounted on a tire. In brief, the tread portion (T) of X-shaped surface contact members (M1, M2, M3) do not snugly fit on the threaded portion (7) of tire (4). Hence, this outward bulging creates a serious slack in the system, which makes the anti-skid device unstable under dynamic conditions and the ride unbalanced.

If the tread portion (T) of X-shaped surface contact members (M1, M2, M3) are even slightly wider than the width of threaded portion (7) of tire (4), and if the diameter (X2) of the tire (4) is even slightly narrower than the suitable diameter (X1) which must be used for such a system, this outward bulging (OB) will always occur.

Again, the main reason for outward bulging (OB) and consequent occurrence of slack is that such systems are not universally applicable to a wide range of tire dimensions since achieving a snug fit is highly dependent to the dimensions of X-shaped members (M1, M2 and M3) and to the dimensions of the tire. This constitutes the basic problem in the anti skid devices of the prior art in which the tightening operation is realized tangentially and not radially.

Figure 6:
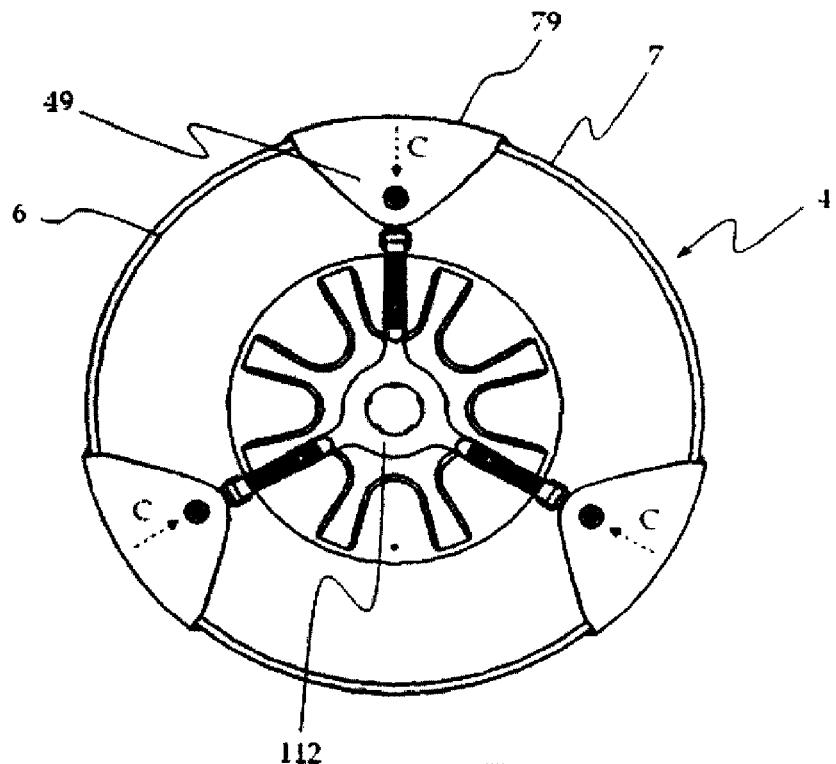
FIG. 6 shows the front view of the system illustrated in FIG. 2A in the absence of slack for tightening in central direction C.

Contrarily, system proposed by the present invention and illustrated in FIG. 6 tightens the anti-skid device towards the center of the wheel incrementally and precisely, hence eliminating slacks. The tightening system, therefore, becomes universally applicable to a wide range of tire dimensions. This universal applicability prevents bulging (OB) which occurs as a result of loose-fitting of the system onto the tire (4) due to dimensional incompatibilities and oblique or tangential tightening direction. Assuming that the surface contact members (79) are substantially U-shaped and the tire diameter is narrower, surface contact members (79) can still be snugly fit onto the tire (4). In such a case, the proximal ends (49) are to be pulled more towards the center of the wheel (1). Thus, there is no dependency to the dimensions of the tire or surface contact member.

Figure 7:
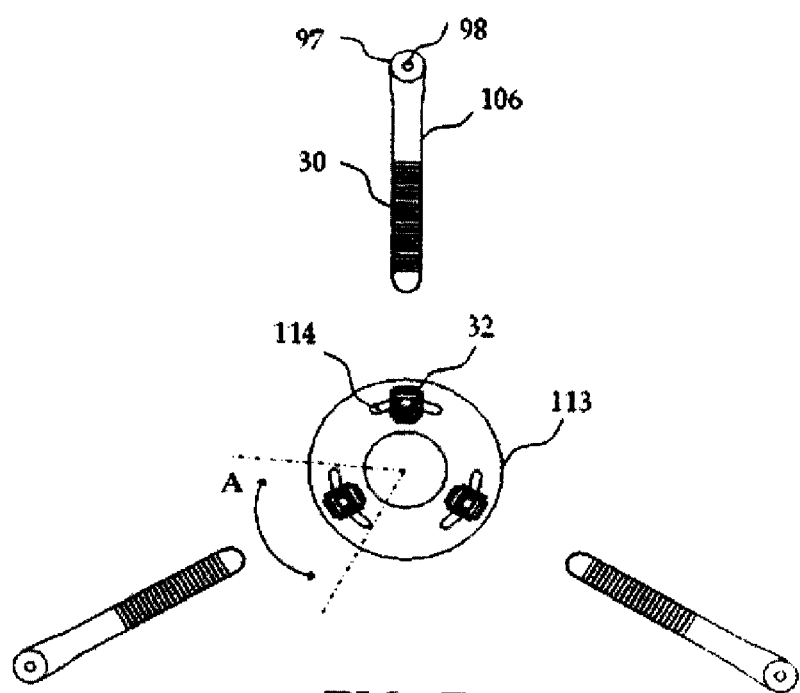
FIG. 7 shows an alternative system to that of FIG. 1B in which buckles are allowed to move to some extent in a way to better catch the corresponding straps, and to accommodate any possible uneven distribution of surface contact members around the periphery of the tire during mounting.

A further alternate embodiment of the invention is shown in FIG. 7. This embodiment proposes an independent central node (113) having, instead of a plurality of extensions, a plurality of arc shaped slots (114) for allowing buckles (32) or straps to move to some extent in the tangential direction. This tangential freedom of movement is used by buckles (32) located in the arc shaped slots (114) to better catch corresponding straps extending from the surface contact members by means of sliding along direction A inside said slots (114) as shown in FIG. 7. This freedom provides great flexibility to the whole system against any irregular distribution of the surface contact members along the tire periphery during installation.

Figure 8A:
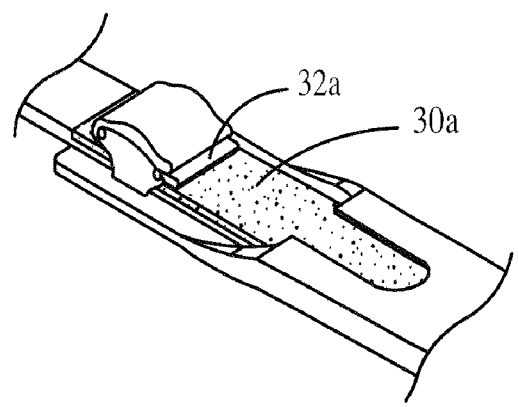
FIGS. 8A and 8B show an alternate embodiment of the invention wherein hook and loop fasteners replace the ratchet teeth and buckle connecting members.
Figure 8B:
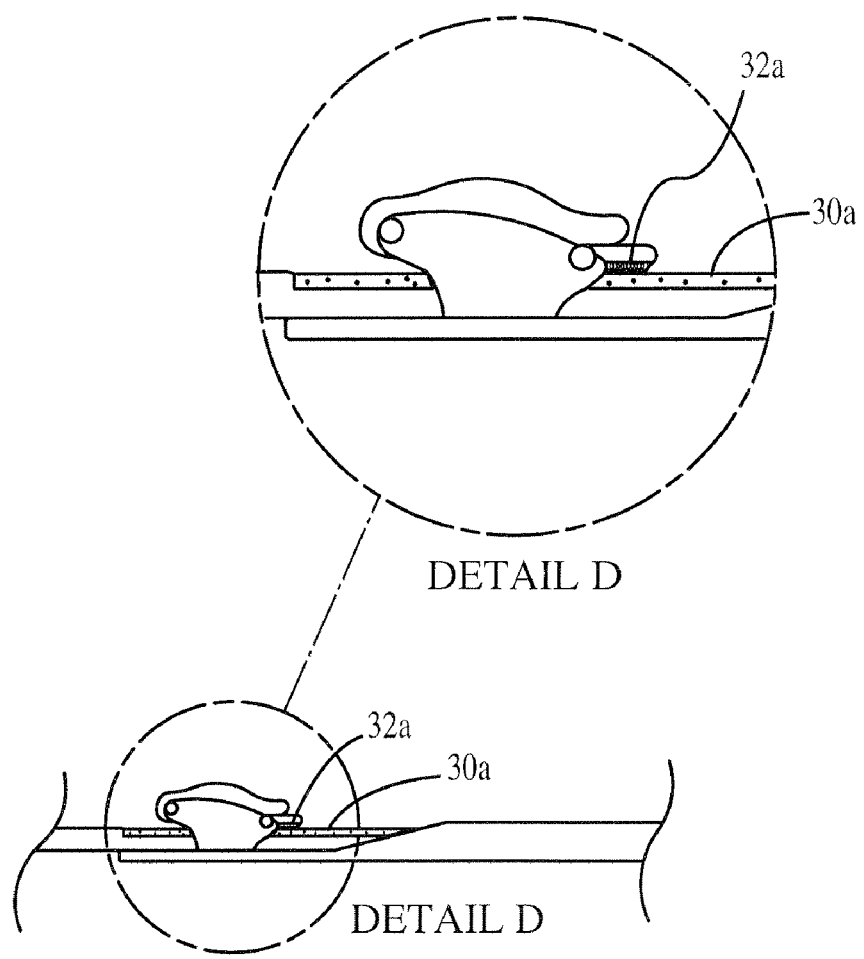

In a further alternate embodiment of the present invention shown in FIGS. 8A and 8B, connecting members are in the form of straps having Velcro® portions (30a, 32a) for tightening surface contact members. The Velcro® hook (30a) and Velcro® loop (32a) portions are used in place of the aforementioned ratchet teeth (30) and buckle (32).

Surface contact members used with the central tightening system of the present invention are preferably made of flexible, durable and wear/tear/abrasion resistant polymers such as high performance polyurethane. Materials of these may further be enriched with abrasive particles (e.g. Silicon Carbide, etc.) and anti-slipping agents (e.g. Silica, etc.) for improved performance in adverse road conditions, and generally manufactured through injection molding. These contact members have a mesh structure on their surface for improved traction with the ground and for better cohesion with the tire treads. Grooves provided close to the edges provide better bending and stretching for snug-fit on the treaded surface of the tire. Nevertheless, it should be mentioned that surface contact members shown in the accompanied drawings do not form an essential part of the invention and the tightening system of the present invention can be applied to a large number of anti skid devices that utilize different gripping members, e.g. chain links of conventional snow chains, etc.

The invention claimed is:

1. A tightening system for use in anti-skid and traction enhancement devices, comprising:
an anti-skid device comprising at least three, separate u-shaped contact members, each contact member having a pair of triangular shoulder portions situated on opposing surfaces of a vehicle wheel, the triangular shoulder portions being connected by a rectangular gripping portion abutting treads of the wheel;
a central node (111, 112, 113) which is located on a principle axis of an axle of the wheel, said central node having a plurality of arms integrally formed thereon and only extending away from an outer circumferential surface of the central node and a corresponding plurality of extensions extending from a free end of a corresponding arm adapted to fasten and tighten a plurality of radially extending straps around a periphery of said central node and being free of any connection to the wheel; and
a plurality of radially extending flexible straps, which are attached to tips of the triangular shoulder portions at their first ends and are directly attached to the extensions extending from the free ends of the arms of said central node (111, 112, 113) at their second ends, wherein said flexible straps are bent and passed through a corresponding buckle (32) for tightening said surface contact members in a radial direction,
wherein said straps are provided with ratchet teeth (30) along at least one of their surfaces, and
said buckle (32) has a driving thumb (36) which, when pulled in a first direction, adjusts a tightness of each strap and said each strap is prevented from reverse movement by a tooth (38) and a pawl (37) of said buckle (32).

2. A tightening system for use in anti-skid and traction enhancement devices as set forth in claim 1 wherein at least one of the straps has at least one hook and loop portion for securing said strap after tightening.

3. A tightening system as set forth in claim 1 wherein a center of said central node (111, 112, 113) is hollow and allows installation of a tightening system on hubs having outward projections (250).

4. A tightening system as set forth in claim 1, wherein said buckle (32) has a release thumb (35) which is pivoted around a joint (E) and which move together with said driving thumb (36) as the driving thumb (36) is pulled in the first direction.

5. A tightening system as set forth in claim 1 wherein said buckle (32) has a release thumb (35) which disengages the teeth (38) and pawl (37) from said each strap when pulled in a second direction.

6. An anti-skid or traction enhancement device comprising the tightening system of claim 1.

7. A tightening system for use in anti-skid and traction enhancement devices, comprising:
an anti-skid device comprising at least three, separate u-shaped contact members, each contact member having a pair of triangular shoulder portions situated on opposing surfaces of a vehicle wheel, the triangular shoulder portions being connected by a rectangular gripping portion abutting treads of the wheel;
a central node (111, 112, 113) which is located on a principle axis of an axle of the wheel, wherein said central node (111, 112, 113) has a plurality of arc shaped recesses (114) defined therein and adapted to fasten and tighten a plurality of radially extending straps around a periphery of said central node and being free of any connection to the wheel; and
a plurality of radially extending flexible straps, which are attached to tips of the triangular portions at their first ends and to said central node (111, 112, 113) at their second ends, wherein said flexible straps are bent and passed through a corresponding buckle (32) located in an arc shaped recess of the central node for tightening said surface contact members in a radial direction,
wherein said straps are provided with ratchet teeth (30) along at least one of their surfaces, and said buckle (32) has a driving thumb (36) which, when pulled in a first direction, adjusts a tightness of each strap and said each strap is prevented from reverse movement by a tooth (38) and a pawl (37) of said buckle (32), wherein said arc shaped recesses provide limited angular movement of said straps or buckles (32) and allows said straps or buckles to match with their corresponding fastening members in cases of uneven distribution of surface contact members around a periphery of the tire.

* * * * *